(12) United States Patent
Kim

(10) Patent No.: US 7,088,403 B2
(45) Date of Patent: Aug. 8, 2006

(54) LIQUID CRYSTAL DISPLAY

(75) Inventor: Kyoung Sub Kim, Kumi-shi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 19 days.

(21) Appl. No.: 10/290,374

(22) Filed: Nov. 8, 2002

(65) Prior Publication Data

US 2003/0117562 A1    Jun. 26, 2003

(30) Foreign Application Priority Data

Dec. 22, 2001   (KR) ................................ 2001-83240

(51) Int. Cl.
*G02F 1/1333* (2006.01)
(52) U.S. Cl. ............................. 349/58; 349/59; 349/60
(58) Field of Classification Search .................. 349/58, 349/149, 150, 151, 152, 59, 60
See application file for complete search history.

(56) References Cited

U.S. PATENT DOCUMENTS

| | | | |
|---|---|---|---|
| 5,748,269 A * | 5/1998 | Harris et al. .................. 349/58 |
| 6,043,855 A * | 3/2000 | Grave .......................... 349/58 |
| 6,175,396 B1 * | 1/2001 | Kim et al. ..................... 349/58 |
| 6,405,413 B1 * | 6/2002 | Ichimaru et al. .............. 24/297 |
| 6,426,784 B1 * | 7/2002 | Sakai et al. .................... 349/58 |
| 6,504,586 B1 * | 1/2003 | Lee .............................. 349/58 |
| 6,587,166 B1 * | 7/2003 | Lee et al. ...................... 349/58 |
| 6,917,395 B1 * | 7/2005 | Lee .............................. 349/58 |

FOREIGN PATENT DOCUMENTS

| | | | |
|---|---|---|---|
| JP | 04097229 A | * | 3/1992 |
| JP | 05273572 A | * | 10/1993 |
| JP | 06347814 A | * | 12/1994 |

* cited by examiner

*Primary Examiner*—Andrew Schechter
*Assistant Examiner*—David Chung
(74) *Attorney, Agent, or Firm*—McKenna Long & Aldridge LLP

(57) ABSTRACT

A liquid crystal display with a liquid crystal display module includes a printed circuit board PCB for supplying driving signals to a liquid crystal display panel, a bottom cover for supporting the liquid crystal display module, and a fixing clip for securing the PCB and the bottom cover together.

16 Claims, 3 Drawing Sheets

LIQUID CRYSTAL DISPLAY

This application claims the benefit of Korean Patent Application No. 2001-83240, filed on Dec. 22, 2001, which is hereby incorporated by reference for all purposes as if fully set forth herein.

BACKGROUND OF THE INVENTION

1. Field of the Invention

This invention relates to a liquid crystal display, and more particularly to a liquid crystal display capable of preventing the generation of metal impurities.

2. Discussion of the Related Art

Liquid crystal displays are smaller in size than cathode ray tubes and are used extensively in potable televisions and monitors of lap-top computers. Active matrix liquid crystal displays use thin film transistors (TFTs) as switching devices to display pictures corresponding to video signals (e.g., television signal) inputted to a pixel matrix.

The pixel matrix contains pixels arranged at crossings between the gate lines and data lines. Each pixel within the pixel matrix includes a liquid crystal cell that controls light transmittance of a liquid crystal in accordance with a voltage level of a data signal applied from the data line. Installed where the gate and data lines cross each other, TFTs switch the data signal in response to the scanning signal (gate pulse) applied from the gate line to transmit data signals to liquid crystal cells.

Referring to FIGS. 1 and 2, liquid crystal displays typically include a bottom cover 10, a top case 34, a liquid crystal display module disposed between the bottom cover 10 and the top case 34, and a driving circuit 40 for driving the liquid crystal display module.

The liquid crystal display module includes a liquid crystal display panel 30 for displaying pictures and a backlight unit for generating light. Though not shown, the liquid crystal display panel 30 includes an active area, where pictures are displayed, and a non-active area surrounding the active area, where no pictures are displayed.

The liquid crystal display panel 30 includes an upper substrate 30a supporting a color filter array and an alignment film (not shown), a lower substrate 30b supporting a TFT array and an alignment film (not shown), and liquid crystal material (not shown) interposed between the upper substrate 30a and the lower substrate 30b.

The backlight unit includes a lamp assembly comprised of at least one lamp 20a for generating light, a light guide panel 20d for converting the generated light into a planar light source, a lamp housing 20b provided so as to cover the lamp 20a and to reflect the generated light toward a light guide panel 20d, a reflection plate 20c for reflecting the generated light toward the liquid crystal display panel 30, and at least one optical sheet 20e for diffusing the converted light transmitted by the light guide panel 20d.

A main support 32, arranged on the backlight unit, supports the liquid crystal display panel 30.

A driving circuit 40 for driving the liquid crystal display panel 30 includes a printed circuit board (PCB) 40c, a tape carrier package (TCP) 40a for connecting the liquid crystal display panel 30 with the PCB 40c, and driving integrated circuits (D-ICs) 40b mounted on the TCP 40a via a tape automated bonding (TAB) technique.

The D-ICs 40b supply data signals and scanning signals to the data lines and the gate lines of the liquid crystal display panel 30, respectively, in response to control signals outputted from the PCB 40c. The lower substrate 30b is bonded to the TCP 40a upon the application of high temperature and high pressure, while the TCP 40a is connected to the PCB 40c via a flat TAB technique. In applying the flat TAB technique, the non-active area provided is relatively large, which reduces the active area. In order to increase the relative size of the active area, TCP 40a may alternatively be connected to the PCB 40c by a TAB technique wherein the PCB 40c is arranged at the side of the top case 34.

The top case 34 covers the edge and side surfaces of the liquid crystal display panel 30 and several other optical components (not shown). Accordingly, the top case 34 protects the liquid crystal display panel 30 from external impacts.

The bottom cover 10 is formed of a metal material (e.g., aluminum Al). Screws 50 are provided within screw holes arranged at one side of the bottom cover 10 near the PCB 40c in order to secure the liquid crystal display panel within the liquid crystal display. As the screws 50 pass through each of the screw holes, the PCB 40c and the bottom cover 10 become secured together. When the screws 50 are received into the screw holes, however, metal impurities from the PCB 40c and the bottom cover 10 are generated. The metal impurities contact electrodes arranged at portions of the TCP 40a located near the screw holes and act to short circuit the electrodes. Securing the bottom cover 10 to the PCB 40c via the aforementioned screw hole/screw system is difficult and requires equipment capable of preventing the generation of metal impurities to the TCP 40a.

SUMMARY OF THE INVENTION

Accordingly, the present invention is directed to a liquid crystal display that substantially obviates one or more of the problems due to limitations and disadvantages of the related art.

Accordingly, an advantage of the present invention provides a liquid crystal display capable of preventing the generation of metal impurities.

In order to achieve these and other advantages of the invention, a liquid crystal display may, for example, include a liquid crystal display module, a bottom cover, and a fixing clip for securing the PCB and the bottom cover together.

In one aspect of the present invention, a fixing recess may be formed within a portion of the PCB for securing the fixing clip.

In another aspect of the present invention, the fixing clip may include a projection that may be received by the fixing recess.

In yet another aspect of the present invention, the liquid crystal display may further include a top case covering the top edge and the side surface of a liquid crystal display panel included within the liquid crystal display module.

In still another aspect of the present invention, the PCB may, for example, be arranged at the rear of the liquid crystal display panel via a bending-type TAB technique.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to an embodiment of the present invention, example of which is illustrated in the accompanying drawings.

Figure 3:
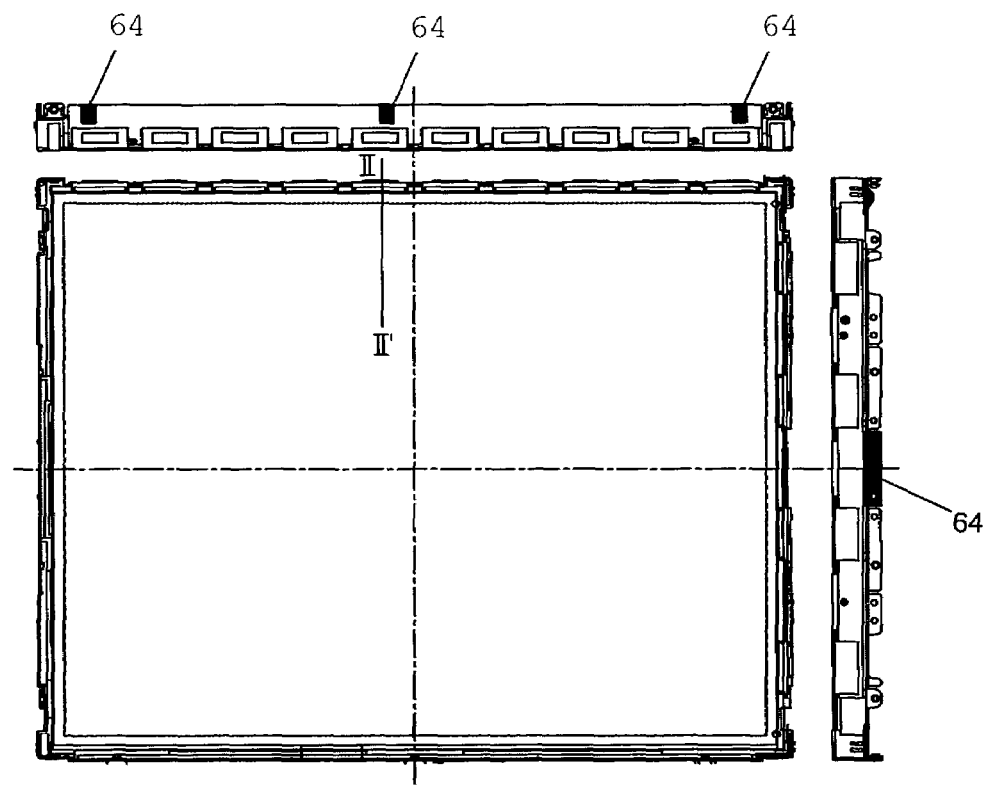
FIG. 3 illustrates a plane view of a liquid crystal display according to one aspect of the present invention.
Figure 4:
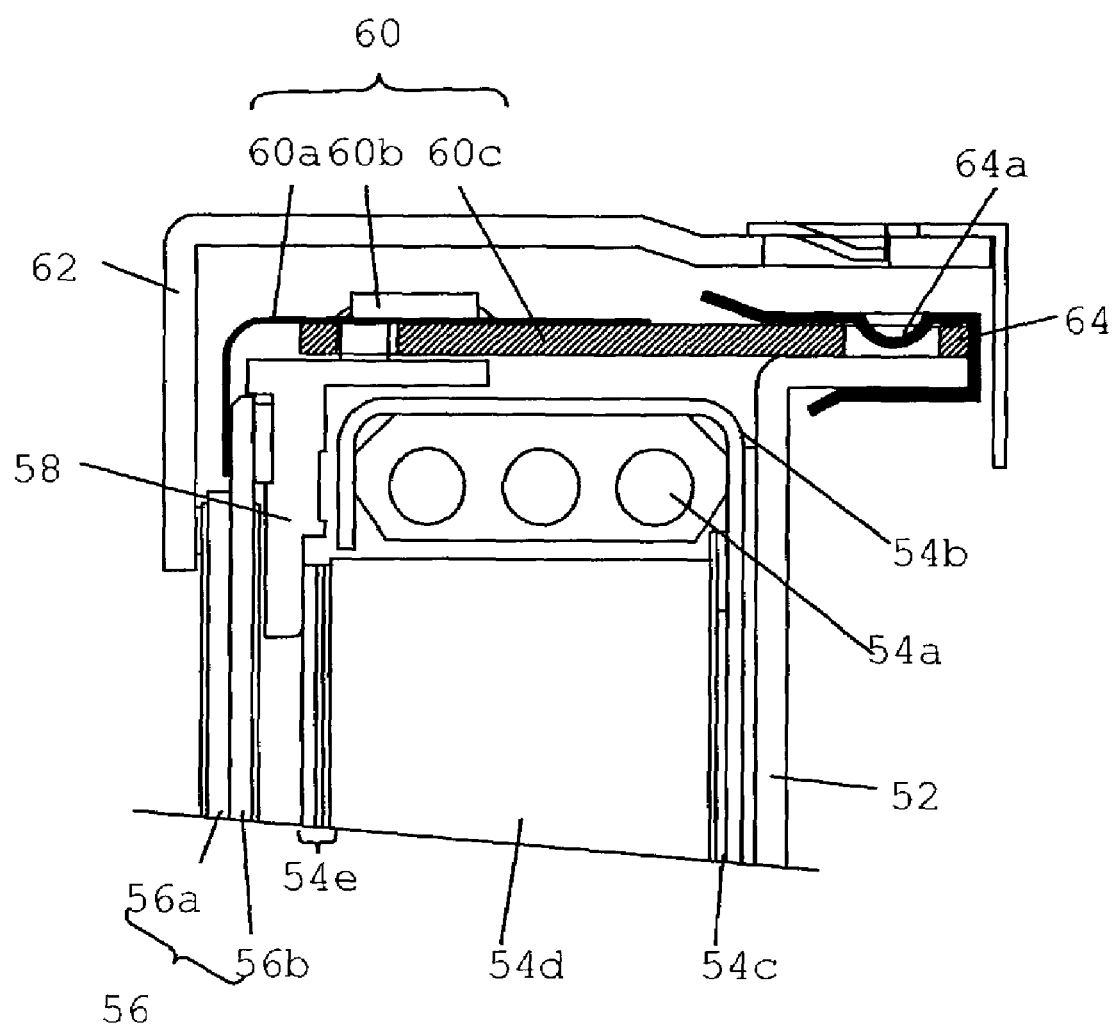
FIG. 4 illustrates a sectional view of the liquid crystal display shown in FIG. 4, along the line II–II'.

With reference to FIGS. 3 to 4, the present invention may be described as follows.

Referring to FIGS. 3 and 4, a liquid crystal display according to one aspect of the present invention includes, for example, a plurality of fixing clips 64 for securing a PCB 60c to a bottom cover 52.

According to the present invention, the liquid crystal display includes a bottom cover 52, a liquid crystal display module disposed between the bottom cover 52 and a top case 62, and a driving circuit 60 for driving the liquid crystal display module.

The liquid crystal display module may include a liquid crystal display panel 56 for displaying pictures and a backlight unit for generating light. Though not shown, the liquid crystal display panel 56 includes an active area, where pictures are capable of being displayed, and a non-active area surrounding the active area, where no pictures are capable of being displayed.

The liquid crystal display panel 56 may, for example, include an upper substrate 56a supporting a color filter array and an alignment film (not shown), a lower substrate 56b supporting a TFT array and an alignment film (not shown), and liquid crystal material (not shown) interposed between the upper substrate 56a and the lower substrate 56b.

A gap between the upper and lower substrates 56a and 56b, respectively, may be provided and maintained by spraying spacers (not shown) between the two substrates. A black matrix (not shown) may be provided to prevent light from being transmitted through a non-active area of the upper substrate 56a. Liquid crystal material may be injected between the gap found between the upper and lower substrates 56a and 56b, respectively.

A main support 58 may be arranged on the backlight unit and support the liquid crystal display panel 56.

The backlight unit may, for example, include a lamp assembly comprised of at least one lamp 54a for generating light, a light guide panel 54d for converting the generated light into a planar light source, a lamp housing 54b provided so as to cover the lamp 54a and to reflect the generated light toward the light guide panel 54d, a reflection plate 54c for reflecting the generated light toward the liquid crystal display panel 56, and at least one optical sheet 54e for diffusing the light transmitted by the light guide panel 54d.

In one aspect of the present invention, the lamp 54a may be provided as a cold cathode fluorescent lamp (CCFL). Arranged at an inside surface of the lamp housing 54b, a reflection surface may reflect light generated from the lamp 54a toward an incident surface of the light guide panel 54d. When the generated light is reflected toward the light guide panel 54d, it is subsequently reflected at a predetermined angle toward both the rear and the front of the light guide panel 54d. Light which has progressed to the rear or side surface of the light guide panel 54d is reflected by the reflection plate 54c back toward the front of the light guide panel. A reflection plate 54c may be installed at the rear of the light guide panel 54d to reflect the generated light toward the liquid crystal display panel 56 to reduce light loss in the backlight unit. As the generated light exits the light guide panel 54d toward the liquid crystal display panel 56, it is diffused by the at least one optical sheet 54e. Accordingly, light may be uniformly transmitted to the liquid crystal display panel 56.

The liquid crystal display panel 56 may transmit light generated by the backlight unit by selectively controlling the movement of liquid crystal material arranged within the gap. Accordingly, black, white, and gray scale values, in addition to various colors via a color filter array, may be selectively expressed via the liquid crystal display panel. Data lines and gate lines, supported by the lower substrate 56b, may be arranged to cross over or under each other. TFTs may be formed where the gate and data line cross and may respond to scanning pulses to supply data signals from data lines to liquid crystal cells.

A driving circuit 60 for driving liquid crystal cells may be provided on liquid crystal display panel 56 and may, for example, include a printed circuit board (PCB) 60c, a tape carrier package (TCP) 60a for connecting the liquid crystal display panel 56 with the PCB 60c, and driving integrated circuits (D-ICs) 60b mounted on the TCP 60a by a bending-type TAB technique.

The D-ICs 60b may supply data signals and scanning signals to the data lines and the gate lines of the liquid crystal display panel 56, respectively, in response to control signals outputted from the PCB 60c. The lower substrate 56b may be bonded with the TCP 60a upon the application of high temperature and high pressure. For example, a pad portion of the lower substrate 56b may be connected with the PCB 60c via the TCP 60a. An anisotropic conductive film (ACF) may be arranged on the pad portion of the lower substrate 56b. An alignment mark arranged on the TCP 60a may be aligned with an alignment mark arranged on the lower substrate 56a. Subsequently, the TCP 60a may be pressed and thereby secured to the ACF. Upon application of heat and pressure, the ACF becomes hardened and the TCP 60a becomes electrically and mechanically connected to the pad portion of the lower substrate 56a. The TCP 60a may be connected to the PCB 60c via a bending-type TAP technique to minimize the relative size of non-active area with respect to the active area of the liquid crystal display panel 56.

In one aspect of the present invention, the bottom cover 52 may, for example, be formed of metal material (e.g., aluminum). A plurality of fixing clips 64 may be provided at one side of the bottom cover 52 near the PCB 60c. In the present aspect, the fixing clips 64 may be open on one end and closed on another end. The fixing clips 64 may further include a projection 64a, wherein the projection 64a may be used to secure the PCB 60c and the bottom cover 52 together. In one aspect of the present invention, a fixing recess may be formed in a portion of the PCB 60c for receiving the projection 64a. When the projection 64a is received within the fixing recess of the PCB 60c, the fixing clip 64 may secure the PCB 60c and the bottom cover 52 together.

Figure 1:
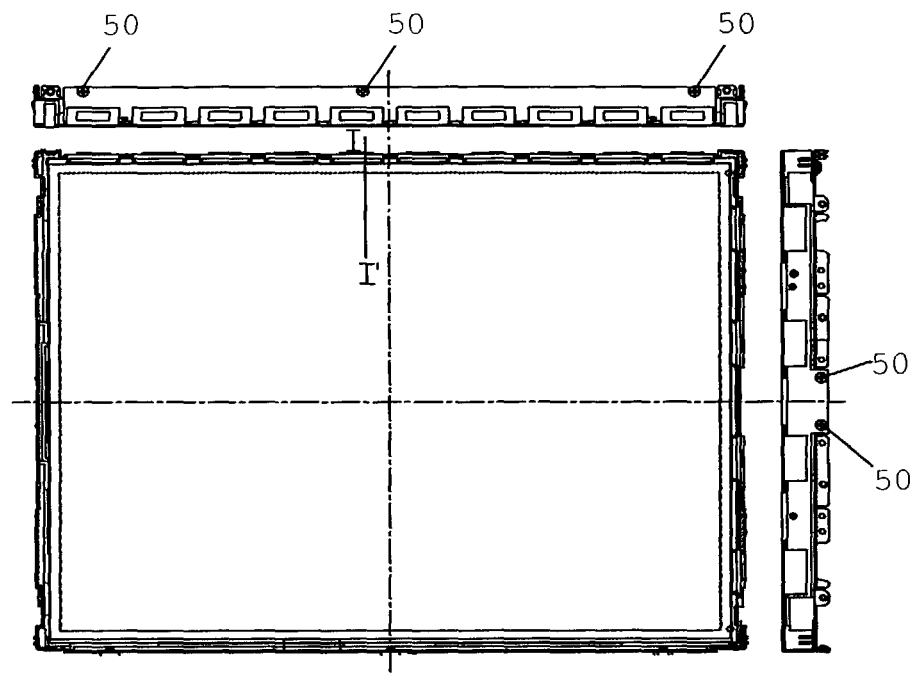
FIG. 1 illustrates a plane view of a liquid crystal display.
Figure 2:
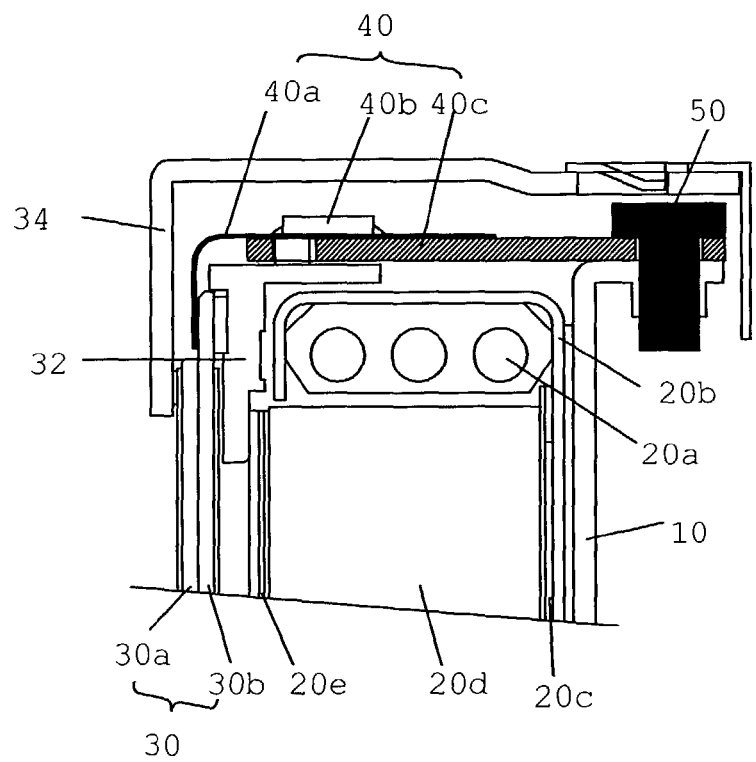
FIG. 2 illustrates a section view of the liquid crystal display shown in FIG. 1, along line I–I'.

According to the principles of the present invention, the fixing clip 64 may be used to secure a PCB to a bottom cover of a liquid crystal display and thus obviate the screw hole/screw system illustrated in FIGS. 1 and 2. Accordingly, the generation of metal impurities may be prevented and the risk of creating short circuits on electrodes of the TCP 60a may be minimized. Furthermore, according to the present invention, use of the fixing clip facilitates the securing of a PCB to a cover.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display, comprising:
a liquid crystal display panel;
a printed circuit board (PCB) for supplying a driving signal to the liquid crystal display panel;
an electrically conductive bottom cover for supporting a liquid crystal display module;
a fixing clip for securing the PCB to the bottom cover; and
a fixing recess arranged within a portion of the PCB for receiving the fixing clip.

2. The liquid crystal display according to claim 1, wherein the fixing clip comprises a projection capable of being received within the fixing recess.

3. The liquid crystal display according to claim 1, wherein the fixing clip comprises an open end and a closed end.

4. The liquid crystal display according to claim 1, further comprising a top case covering a top edge and side surface of the liquid crystal display module.

5. The liquid crystal display according to claim 1, wherein the PCB is installed at a rear of the liquid crystal display panel by a bending-type tape automated bonding (TAB) technique.

6. A monitor, comprising:
a printed circuit board (PCB) for supplying a driving signal to a display panel included within a display module;
a bottom cover for supporting the display module; and
at least one fixing clip for securing the PCB to the bottom cover,
wherein the bottom cover includes:
a first member supporting the display module; and
a second member adjacent to the first member,
wherein the first member and the second member are oriented within non-parallel planes and wherein the second member is contacted by at least one fixing clip.

7. The monitor according to claim 6, further comprising a fixing recess arranged within a portion of the printed circuit board for receiving the fixing clip.

8. The monitor according to claim 7, wherein the fixing clip comprises a projection capable of being received within the fixing recess.

9. A display device, comprising:
a printed circuit board for supplying a driving signal to a display panel included within a display module;
an electrically conductive cover for supporting the display module;
at least one fixing clip for securing the PCB to the electrically conductive cover; and
a fixing recess arranged within a portion of the printed circuit board for receiving the fixing clip.

10. The display device according to claim 9, wherein the fixing clip comprises a projection capable of being received within the fixing recess.

11. The monitor according to claim 6, wherein the bottom cover is electrically conductive.

12. The liquid crystal display according to claim 1, wherein the bottom cover includes:
a first region supporting the liquid crystal display module; and
a second region adjacent to the first region,
wherein the first region and the second region are oriented within non-parallel planes and wherein the second region is contacted by the fixing clip.

13. The display device according to claim 9, wherein the electrically conductive cover includes:
a first region supporting the display module; and
a second region adjacent to the first region,
wherein the first region and the second region are oriented within non-parallel planes and wherein the second region is contacted by at least one fixing clip.

14. The liquid crystal display according to claim 1, wherein the fixing recess extends through the entire thickness of the PCB.

15. The monitor according to claim 7, wherein the fixing recess extends through the entire thickness of the PCB.

16. The display device according to claim 9, wherein the fixing recess extends through the entire thickness of the PCB.

* * * * *